350-96.24 SR
XR 3,815,986
SEARCH ROOM

United States Patent [11] 3,815,986
Darbee [45] June 11, 1974

SUBSTITUTE FOR MISSING XR

[54] DYNAMIC GRAPHIC DISPLAY SYSTEM

[76] Inventor: Paul V. Darbee, 5633 E. Las Santos Ave., Long Beach, Calif. 90815

[22] Filed: May 22, 1972

[21] Appl. No.: 255,424

[52] U.S. Cl. .................. 355/1, 340/324, 340/380
[51] Int. Cl. .................. G03b 27/00
[58] Field of Search .................. 355/1, 47, 52, 56; 340/324, 378, 380

[56] References Cited

FOREIGN PATENTS OR APPLICATIONS 780,976 8/1957 Great Britain .................. 355/1

*Primary Examiner*—John M. Horan
*Attorney, Agent, or Firm*—Bruce L. Birchard

[57] ABSTRACT

An improved graphic display system or sign presenting dynamic images for educational, entertainment, or advertising purposes is described which gives an infinite choice of the images to be displayed with minimum complexity in generating such images and maximum resolution and maximum brightness in the displayed images.

8 Claims, 6 Drawing Figures

DYNAMIC GRAPHIC DISPLAY SYSTEM

BACKGROUND OF THE INVENTION

Dynamic graphic displays for advertising, education and entertainment conventionally utilize a multiplicity of light bulbs arranged in rows and columns, such light bulbs being switched on and off in accordance with a predetermined program.

The control of the light bulbs has become increasingly more sophisticated, complex and expensive to the point where powerful digital computers are effecting the switching, sometimes in response to input information derived from analog computers.

The trend towards psychedelia in advertising has caused increasing interest of the advertising industry in sign images which are dynamic, colorful, and unusual in their appearance.

Unfortunately the systems which have been available in the past are so expensive as to limit the extent of use of such dynamic imagery. Further, where digital computers are involved, re-programming involves developing new software which is a time consuming, as well as an expensive, procedure.

In the dynamic display system according to the present invention, dynamic two-dimensional images generated by electronic or other means are transformed into multiple, linear patterns which are recorded on an appropriate optical medium, usually color film. The transformation at the image recorder involves light-guiding fibers arranged in two dimensional matrices at the image input end and arranged in a linear array adjacent the recording medium, that medium being moved transversely to the center line of the linear array so as to record the motion of the image impinging on the matrices of optical fibers as variable density and variable color tracks on the recording medium.

In the reproducer, the medium, usually developed color film is caused to move past a linear array of optical fibers and a source of illumination on the opposite side of the medium produces, at any instant, at the ends of the fibers, light of color and intensity which corresponds to the pattern recorded previously. The optical fibers from the linear array terminate in two dimensional matrices corresponding to the input matrices in the image recorder. As a result the original image is reproduced on the face of the reproducer matrices. Obviously, the reproducer may be located anywhere that is convenient. Programs may be easily and inexpensively changed in the reproducer and may be duplicated in any desired numbers to supply signs — or reproducers, in widely separated locations.

To achieve maximum light output from the sign or display while retaining the resolution or detail effected by the recorder, multiple fibers of small diameter may be included in a single resolution or tracking element in the linear array, being arranged along the direction of the recorded tracks, and may be disposed in closely spaced fashion as two-dimensional clusters or resolution elements in the display matrices. "Bleeding" or "cross-talk," if any, between the adjacent resolution elements in the linear array is minimized, and construction of the linear arrays is simplified by displacing successive elements alternatively on opposite sides of the center line of the linear array. Thus, the present invention provides relatively low cost, flexible, highly dynamic graphic images with maximum resolution and color fidelity.

BRIEF DESCRIPTION OF THE DRAWINGS

FIG. 4 is a mechanical drawing of the image reproducer of FIG. 1 showing how it is programmed and how it may be intercoupled with other image reproducers of the same type;

DETAILED DESCRIPTION OF THE DISCLOSED EMBODIMENT

Figures 1, 2, 3:
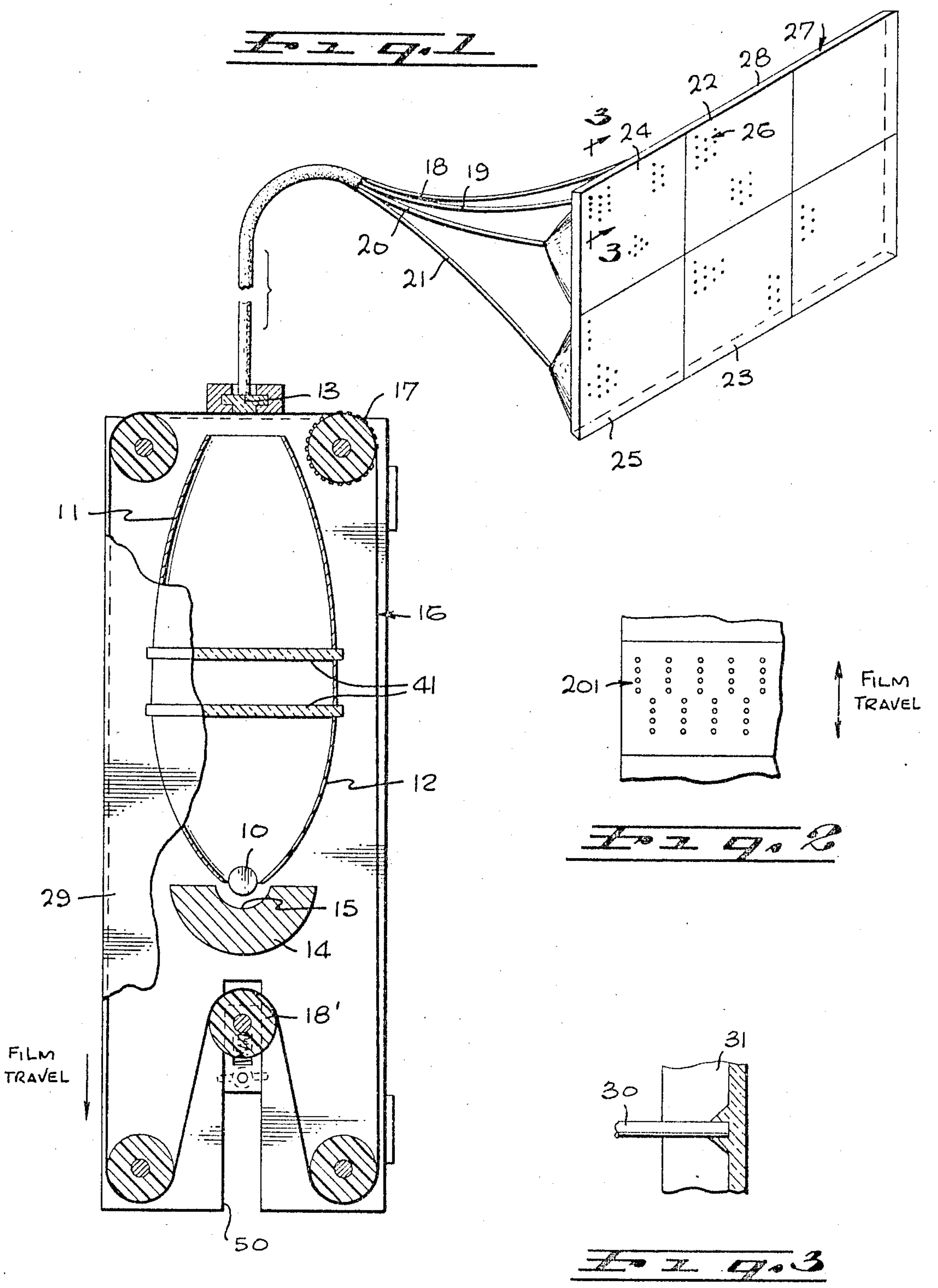
FIG. 1 is a mechanical diagram showing, in schematic form, the location and certain details of the image reproducer according to the present invention.
FIG. 2 is a diagram showing certain details of the linear array portion of the image reproducer of FIG. 1.
FIG. 3 is a representation of a section of one of the display matrix elements of FIG. 1.
Figure 2:
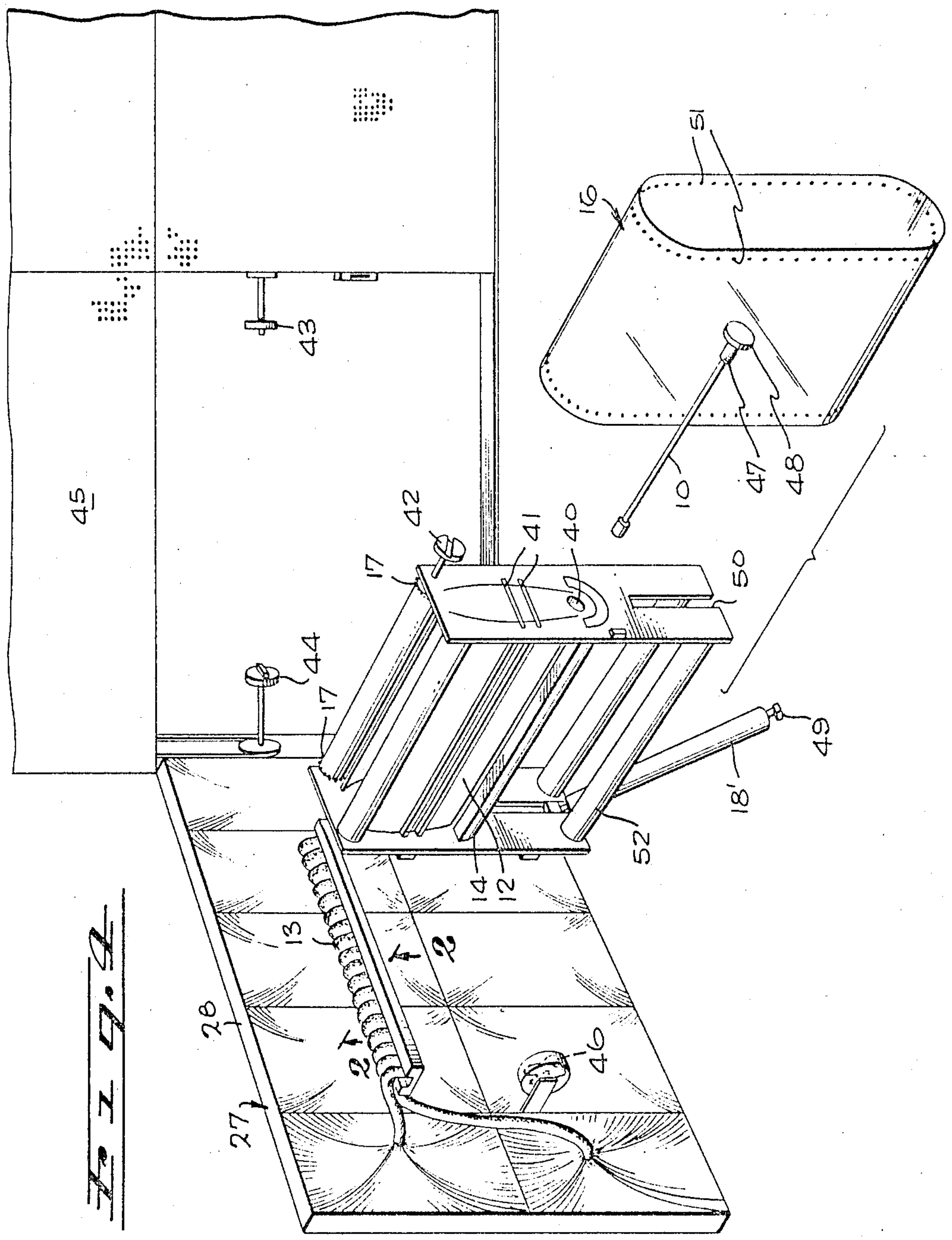

In FIG. 1, quartz-halogen lamp 10 having a length corresponding approximately to the width of the material to be illuminated is mounted with its axis along one of the focal lines of the elliptical reflecting elements 11 and 12, the other focal line of which lies parallel to, at the surface of and along the center line of array 13. It should be understood that reflective elements 11 and 12 are segments of elliptical cylinders. Back reflector 14 has a circular-cylindrical surface 15 which reflects light from the rear of the lamp back through the lamp towards elliptical-cylindrical reflecting surfaces 11 and 12 to insure maximum illumination of film or other transparent material 16 as it passes in front of linear array 13. Drive roller 17 is sprocketed and transparent material or film 16 has perforations along its edges which correspond in size and spacing to the size and spacing of the sprockets on drive roller 17 to assure positive motion of film or transparent material 16. Tensioning roller 18' is spring biased as indicated to assure firm engagement of film 16 with the sprocket of drive roller 17 and continuous driving of film or transparent material 16. Rotation of drive roller 17 is accomplished by means of an external motor, not shown, either directly or by appropriate means through coupling elements associated with other image reproducers. Light output from linear array 13 is taken through fiber bundles 18, 19, 20 and 21 to their respective display matrix elements 22, 23, 24 and 25, respectively. A single resolution element in any of the display matrices is made up of the ends of a plurality of optical fibers (e.g., four) such as are in resolution element 26 in display matrix 22. At appropriate distances, the eye integrates the light from each of the fibers to give an apparent planar, high intensity light source.

The linear disposition of the fibers in linear array 13 is shown in more detail in FIG. 2. Resolution element 201 is representative of the other resolution elements in the linear array and it corresponds to one display matrix resolution element, such as element 26, in FIG. 1. Successive resolution elements in the linear array may be displaced alternately about the center line of linear array 13 along the direction of travel of the film or transparent material 16 which passes over the linear array. The purpose of this displacement will be set forth hereinafter. The resolution elements are also displaced along the axis of the array with the distance of such displacement being minimized to permit the maximum number of resolution elements across the film or transparent material passing over the array.

The display matrix elements, such as 22, 23, 24 and 25 in FIG. 1 are secured in mainframe 27 with their outer edges extending to its outer edges to permit the joining of multiple mainframes for the purpose of achieving a larger display surface without having a discontinuity in the spacing between resolution elements.

In FIG. 3, fiber 30 which is one of the fibers in a resolution element and may be made of acrylic-styrene materials or other plastic, glass, or liquid-filled materials having the appropriate index of refraction to so as to conduct light by total internal reflection is bonded to matrix facepiece material 31 by an appropriate adhesive after being inserted in an aperture in that matrix facepiece and after having its exposed end polished flat. An additional plastic protective plate or diffuser may be placed over the matrix facepiece. Fiber 30 has its opposite end, which terminates in linear array 13, correspondingly polished at right angles to the axis of the fiber.

The image reproducer or display system of FIGS. 1, 2 and 3 operates as follows. Film or transparent material 16 has prerecorded thereon or therein a pattern which may be produced by the recording means described hereinafter. An external source of power such as a motor, or a linkage to an additional unit which is driven, causes drive roller 17 to rotate, thereby moving film 16 over the surface of linear array 13. Light from quartz-halogen lamp 10 is focused with great intensity upon the side of film 16 remote from the linear array and a varying illumination of the linear array occurs corresponding to the pattern on film 16. Resolution elements, such as element 201, in the linear array analyze the light passing through the film along a track which had been prerecorded on the film and which passes over the respective resolution elements, such as element 201.

It has been found that by staggering the resolution elements in the linear array as shown in FIG. 2 the resolution elements may be spaced with minimum spacing across the film or other transparent material carrying the recorded information without producing "crosstalk" between the information sensed by the adjacent resolution elements and without undue complexity in producing the arrays. For example, according to the present invention, the fibers may have a diameter of 0.020 inches and the center to center spacing of successive resolution elements need only be 0.0225 inches. As will be understood more clearly in connection with the discussion of the recording process, the degree of resolution of the initial image that can be achieved by the system is dependent upon the closeness of spacing between successive resolution elements in the linear array. That degree of resolution, of course, determines the amount of detail that can be achieved in the ultimate image to be presented by the display matrix elements making up the ultimate display or sign. The purpose of using multiple fibers in each resolution element rather than a single fiber is to achieve improved brightness in the image ultimately appearing on the display matrix elements. The amount of light transmitted by a fiber optic system is proportional to the square of the diameter of the fibers. At the same time the amount of resolution that can be achieved is inversely proportional to the square of the diameter. Thus, maximum light transmission with maximum resolution has been achieved, according to this invention, by utilizing multiple small diameter fibers in the linear array to make up a single resolution element reading a single track of optical information from the film or other transparent material used in the system.

For maximum operating life of the system it is desirable that the fibers associated with each of the display matrix elements be potted in a material such as urethane foam.

In FIG. 4, tensioning roller 18' is shown in its released position after film 16 has been removed. Quartz-halogen lamp 10, which may have a 600 watt rating, is shown in the removed position ready for reinsertion in aperture 40. Mainframe 27 has been swung out of permit removal of film 16 and replacement of lamp 10. Linear array 13 is shown in a displaced position with respect to back reflector 14 and elliptical reflecting surface 12. In FIG. 4, heat absorbing glass elements 41 are shown as being interposed between the lamp and the surface to be illuminated. It is necessary to use these heat absorbing elements in order to prevent the temperature at the ground faces of the fibers from rising above 170°F. The plastic fibers will tend to melt above that temperature and the performance of the entire system would thus be destroyed. When mainframe 27 is swung out of its normal operating position the drive mechanism for roller 17 is decoupled as a result of the decoupling of clutch elements 42 and 43 and the decoupling of clutch element 44 and its cooperating clutch element associated with its corresponding end of drive roller 17. Clutch element 44 may be driven by a chain or other mechanical linkage to an associated display matrix such as display matrix 45 in FIG. 4. FIG. 4 shows the concept of combining multiple display matrix elements to achieve a larger display or sign.

The perforations along the edges of film or transparent material 16 assure its proper positioning with respect to the resolution elements in the linear array. This "tracking" is necessary to assure reproduction on the face of the display matrix elements of the information originally recorded, as described hereinafter, on film 16.

Fan 46 in FIG. 4 removes heat from heat-absorbing glass elements 41 in order to maintain the internal temperature of the display system within the limits that can be tolerated by the plastic fibers utilized in the system.

To put the reproducer of FIG. 4 into operation lamp 10 is returned through aperture 40 to its position in front of back reflector 14 and is secured in place by threads 47 on cap 48. Film 16 is slipped over the sprockets of drive roller 17 until perforations 51 in film 16 are aligned with the sprockets of drive roller 17 and tensioning roller 18' is then swung back into its operating position with end 49 engaging slot 50 so that it engages the outer surface of film 16 snugly in response to the spring biasing upon roller 18'. Transport assembly 52 is then swung into position with linear array 13 aligned with lamp 10. Mainframe 27 is then swung into a closed position which aligns the outer surfaces of matrices 22, 23, 24 and 25 with the outer surfaces of the matrices in mainframe 45. Coincident therewith clutch elements 42 and 43 are engaged as are clutch elements 44 and its cooperating element not shown. When electrical power is applied to the system drive roller 17 is caused to rotate either directly by a motor or by coupling to such a motor through the driving mechanism of contiguous image reproducers, lamp 10 is lighted and fan 46 is activated. The minimum speed at which film 16 can be moved and, hence, the maximum time duration of the program recorded on a given length of film is determined by the fiber diameter used and by the number of fibers in each resolution element. For a system using fibers which are 0.020 inches in diameter with four such fibers reading a single track, a speed of 0.3 inches per second is adequate. Higher speeds of film motion may be utilized during the reproduction process and the direction of the film may also be changed without adverse effects. There is no shutter and therefore no flicker will occur. Further, the film can be stopped at any point in its travel. Thus, the film may be driven intermittently or indexed.

It is often desirable for a display or sign to be of a large size. It is possible, of course, to build a fiber optic display of any size, but it is much less costly to mass produce reproducing units in a smaller size and to gang those units both vertically and horizontally, as indicated in FIG. 4, to achieve the larger display area. Of course, ganged units must be synchronized for a proper display of the desired graphic information. This can be achieved easily by running the sprocketed drive roller 17 off common horizontal shafts and by running those horizontal shafts from a common motor. As has been indicated, to assure that the image appearing on the face of the display matrices of the ganged unit is continuous the individual mainframes must be made so that they support the matrices with their outer edges extending to the mainframe outer edges with the result that the spacing of the resolution elements remains constant across the boundaries between contiguous image reproducers.

For applications requiring extended programs, an attachment may be provided consisting of multiple tensioning rollers; or actual pick-up and supply reels, such as are used in movie projection, may be utilized.

It is to be noted that the graphic display which is the subject of this invention, like any display which utilizes light sources to produce the image, performs best in low ambient light because of the contrast ratio which can be achieved under those conditions. Thus, displays of the type described in FIGS. 1 through 4 can be used effectively only at night, under conditions of heavy cloudiness, or in the shade, if such displays are outdoors. To assure that the space on the face of the graphic display is not wasted during the daylight hours in an outdoor display a static display or sign may be painted on a plastic or other surface which has in its holes corresponding in size and position to the size and position of the ends of the optical fibers at the outer surface of the display matrices. Because of the small size of the openings they will not disturb the impact of the static sign during the daylight hours and at night light from the fibers will be emitted through the holes in the superimposed static sign on the outer face of the graphic display. Under those conditions with low ambient light the static sign will not be visible but the dynamic graphics will be visible to the viewer.

An optical fiber, such as that shown in FIG. 3 if of plastic and polished flat on an end emits light in approximately a 60 degree cone. The fiber ends can be formed into spherical convex lenses by a simple heating process. This convexity results in a convergence of the light emitted from the fiber with an apparent increase in the light output from the graphic display if one is directly in front of the display. However, the directionality of viewing is increased and the viewing angle may be reduced to 15 or 20°. If a wide viewing angle is desired a diffusing screen may be placed in front of the display matrices and the light emanating from the display matrices will be diverged. The viewing angle is thus increased but the brightness is correspondingly decreased.

Figures 5, 6:
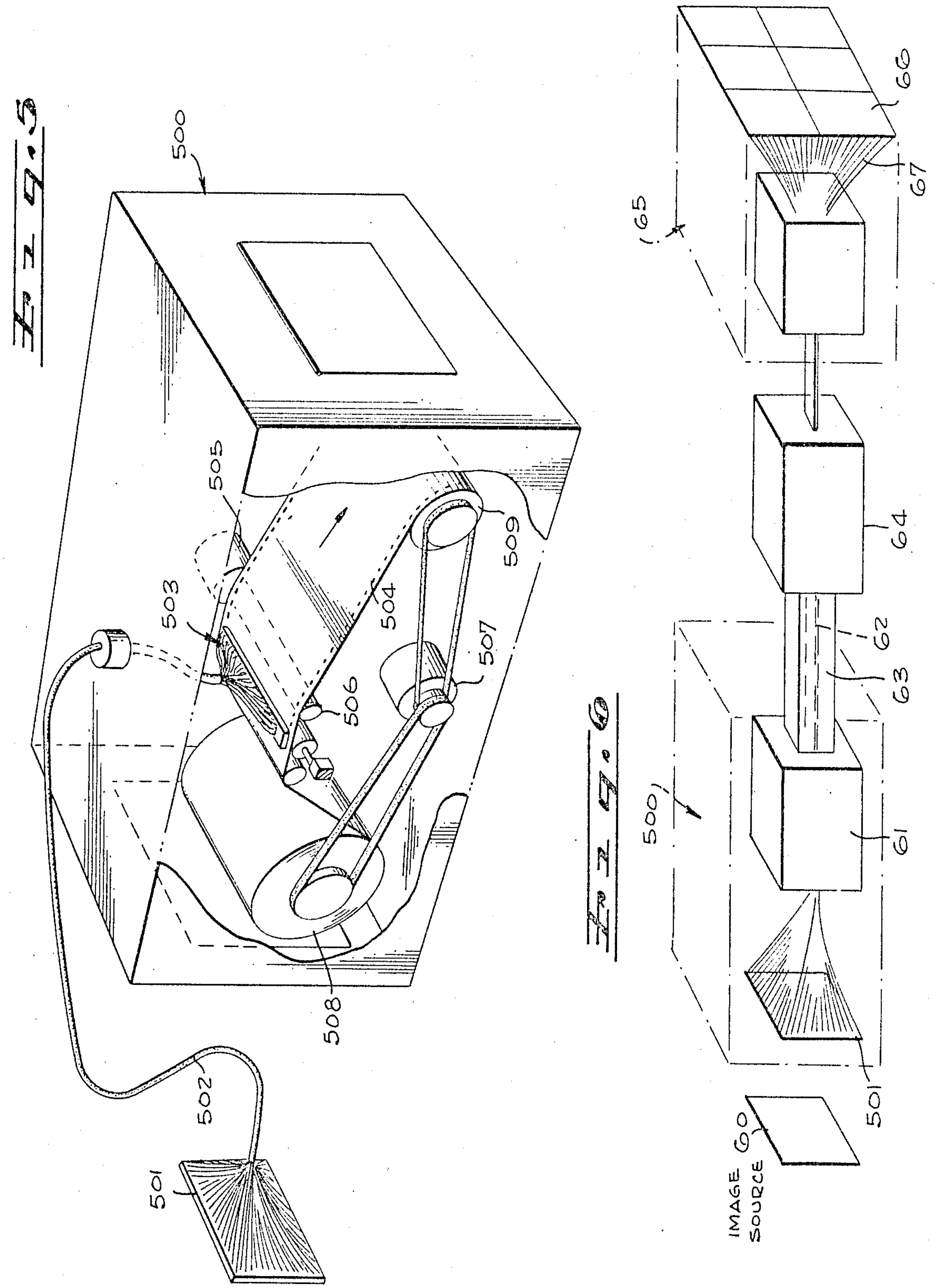
FIG. 5 is a schematic drawing of an image recorder according to the present invention.
FIG. 6 is a block diagram of system according to the present invention in which a medium processor operates "on-line" to permit continuous large scale high intensity display from a small low-intensity image.

In FIG. 5 image recorder 500 includes input matrix 501 which is coupled through fiber bundle 502 to linear array 503. In contrast to the image reproducer, the image recorder has only one fiber in each resolution element at the input matrix and at the linear array. This is because quick changes in light color or intensity within a single fiber can expose smaller areas of the recorded track than multiple fibers can. The source of the image which is caused to impinge upon the input matrix must have adequate light output so that a single fiber may carry sufficient light to the linear array to effect proper exposure of film 504 as it passes over linear array 503. Drive roller 505 rotates sprocketed roller 506. These sprockets, 506, engage sprocket holes in the edges of film 504 to assure positive lateral alignment and motion of film 504 in response to rotation of the shaft of drive motor 505. The emulsion on film 504 is oriented in an upward manner facing the linear array. Film drive motor 507 may be provided to drive the film take-up roll 509. Image recorder 500 must, of course, be light-tight to prevent spurious exposure of film 504. The fibers in linear array 503 may be disposed alternately on opposite sides of the center line of linear array 503 so as to match the arrangement of fibers in the reproducer. After a complete program is recorded on film 504 the film is developed and formed into a loop such as film 51 in FIG. 4. The source of images viewed by input matrix 501 may be a color television monitor or any other light generating source. The images themselves may be generated by any one of a number of means presently available such as by analog or digital computers or combinations thereof.

In FIG. 6 light from image source 60, which may be the cathode-ray tube in a color television receiver, not shown, falls upon input matrix 501 in image recorder 500. Light is coupled to linear array 503 (not shown here) inside light box 61 and linear recordings of optical information are made upon medium 62, which in this case may be color film. Exposed film passes through light-tight section 63 to processor 64, which may be a conventional film processor of any one of several known types that do not require description here. Processed film passes from processor 64 to image reproducer 65 where it is illuminated and scanned by a linear array, as described in connection with FIGS. 1, 2 and 3 and the light information thus derived is coupled to display 66 through optical bundles 67.

While the use of photographic color film has been described in connection with this invention, thermoplastic recording and other methods of recording optical images may be utilized. In such cases development of the medium to bring out the recorded optical information may not be necessary and the medium, as it emerges from the image recorder may pass directly to the image reproducer. This same end might be achieved by interposing an automatic photographic film developer between image recorder 500 and image reproducer 29.

While a particular embodiment has been described, modifications may be made within a scope of this invention. The following claims are intended to cover such embodiments.

What is claimed is:

1. An image reproducer including: at least one transport mechanism adapted to carry thereon a medium bearing a plurality of parallel, pre-recorded, linear, optical tracks; at least one bundle of light-conducting fibers, each fiber having first and second ends; an array of first resolution elements mounted proximate to said at least one transport mechanism during the operation thereof and extending across a major portion of such medium, each of said first resolution elements including a plurality of said first ends of said light-conducting fibers; said plurality of first ends in each of said resolution elements being positioned to cooperate with a respective one of said tracks; means for illuminating said medium proximate to said first resolution elements to reveal said optical tracks recorded on said medium; a display face including at least one matrix having a mainframe and a plurality of second resolution elements, each of said second resolution elements including a plurality of said second ends of said light-conducting fibers; said second resolution elements each being disposed in a predetermined two-dimensional fashion in its matrix; whereby, upon movement of said medium bearing said pre-recorded, linear, optical tracks past said array by its associated transport mechanism said linear optical tracks are transformed into two-dimensional images.

2. An image reproducer according to claim 1 in which said medium is exposed, developed color film.

3. An image reproducer according to claim 1 in which said first and said second resolution elements each include first and second ends, respectively, of said light-conducting fibers.

4. Apparatus according to claim 1 in which said display face includes a plurality of matrices, the mainframes of contiguous matrices supporting said matrices in close proximity to each other so that the spacing between second resolution elements within said matrices is substantially the same as the spacing of said second resolution elements across the boundaries between contiguous matrices.

5. Apparatus according to claim 1 in which said display face carries a static graphic image thereon.

6. Apparatus according to claim 1 in which said plurality of first and second ends, respectively, each comprises a number equal to that of the other, and that number is a perfect square of a small integer.

7. Apparatus according to claim 1 in which the movement of said medium is intermittent.

8. Apparatus according to claim 1 in which said display face has superimposed thereon an apertured surface bearing an image, the apertures of said surface being coincident in location with the location of said second ends of said light conducting fibers.

* * * * *